US012093096B2

(12) United States Patent
Bhaskara et al.

(10) Patent No.: US 12,093,096 B2
(45) Date of Patent: Sep. 17, 2024

(54) RULER-FOLLOWER DYNAMIC VOLTAGE AND FREQUENCY SCALING SCHEMES FOR INTEGRATED CIRCUIT COMPONENTS

(71) Applicant: QUALCOMM Incorporated, San Diego, CA (US)

(72) Inventors: Aravind Bhaskara, San Diego, CA (US); Zhurang Zhao, San Diego, CA (US); Kiran Bhagwat, San Diego, CA (US); Michael Tipton, Midlothian, VA (US); Joshua Stubbs, Longmont, CO (US); Jyotirmoy Das, San Diego, CA (US); Thomas Tang, Pleasanton, CA (US)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 18/082,518

(22) Filed: Dec. 15, 2022

(65) Prior Publication Data

US 2024/0201762 A1   Jun. 20, 2024

(51) Int. Cl.
*G06F 1/00* (2006.01)
*G06F 1/08* (2006.01)
*G06F 1/26* (2006.01)
*G06F 1/3203* (2019.01)

(52) U.S. Cl.
CPC ............ *G06F 1/26* (2013.01); *G06F 1/08* (2013.01); *G06F 1/3203* (2013.01)

(58) Field of Classification Search
CPC ..................................... G06F 1/26; G06F 1/08
USPC .......................................................... 713/300
See application file for complete search history.

(56) References Cited

U.S. PATENT DOCUMENTS

| | | | | |
|---|---|---|---|---|
| 8,880,844 B1* | 11/2014 | Bhattacharjee | ..... | G06F 12/1027 711/204 |
| 11,221,667 B1* | 1/2022 | Ravipati | ............... | G06F 1/3296 |
| 2012/0179303 A1* | 7/2012 | Anderson | ............... | G06F 1/206 700/299 |
| 2012/0233477 A1* | 9/2012 | Wu | ....................... | G06F 1/3287 712/E9.035 |
| 2014/0189297 A1* | 7/2014 | Narvaez | .............. | G06F 9/45558 712/29 |
| 2014/0189377 A1* | 7/2014 | Subbareddy | .............. | G06F 9/44 713/300 |
| 2014/0189704 A1* | 7/2014 | Narvaez | ................ | G06F 9/5094 718/104 |
| 2014/0232188 A1* | 8/2014 | Cheriyan | ............... | G06F 1/3296 307/31 |
| 2017/0169875 A1* | 6/2017 | Gans | ................... | G11C 11/4074 |
| 2018/0113502 A1* | 4/2018 | Raja | ..................... | G06F 15/7807 |
| 2020/0363860 A1* | 11/2020 | Ananthakrishnan | ........................ | G06F 11/349 |

(Continued)

OTHER PUBLICATIONS

International Search Report and Written Opinion—PCT/US2023/078393—ISA/EPO—Jan. 30, 2024.

*Primary Examiner* — Volvick Derose
(74) *Attorney, Agent, or Firm* — Loza & Loza, LLP

(57) ABSTRACT

Various dynamic voltage and frequency scaling (DVFS) techniques can optimize the high voltage residency of a device containing multiple processing cores that share a voltage rail. The DVFS techniques described herein can reduce the high voltage residency (duration) of the voltage rail by aligning the high frequency duration of multiple cores sharing the same voltage rail.

25 Claims, 11 Drawing Sheets

(56) References Cited

U.S. PATENT DOCUMENTS

2021/0064426 A1\* 3/2021 Gupta ..................... G06F 1/10

\* cited by examiner

| | V1 | V2 | V3 | ... | Vmax |
|---|---|---|---|---|---|
| Core A | Fa-1 | Fa-2 | Fa-3 | ... | Fa-max |
| Core B | Fb-1 | Fb-2 | Fb-3 | ... | Fb-max |
| Core C | Fc-1 | Fc-2 | Fc-3 | ... | Fc-max |
| Core D | Fd-1 | Fd-2 | Fd-3 | ... | Fd-max |

| Core A | Fa-1 | Fa-2 | Fa-3 | | Fa-max |
|---|---|---|---|---|---|
| Core B | Fb-1 | Fb-2 | Fb-3 | ... | Fb-max |
| Core C | Fc-1 | Fc-2 | Fc-2 | Fc-2 | Fc-2 |
| Core D | N/A | N/A | N/A | ... | N/A |

RULER-FOLLOWER DYNAMIC VOLTAGE AND FREQUENCY SCALING SCHEMES FOR INTEGRATED CIRCUIT COMPONENTS

TECHNICAL FIELD

Aspects of the present disclosure relate generally to clocking frequencies for integrated circuit components and, in particular, dynamic voltage and frequency scaling (DVFS) techniques suitable for use with integrated circuits.

INTRODUCTION

Some integrated circuits such as a system on a chip (SoC) can include multiple processors or cores integrated on the same chip. For example, an SoC may include two or more of the following: a central processing unit (CPU), a display processor, a video encoder/decoder, an audio processor, a graphics processing unit (GPU), etc. Typically, an SoC includes resources that are shared among multiple processors or cores. For example, the shared resources may include a shared memory interface configured to interface the processors to an external memory (e.g., dynamic random access memory (DRAM)). The shared resources may also include a shared power supply rail, a shared system bus, etc.

The performance of an SoC can be increased by increasing the clocking frequency applied to the SoC. The increased clocking frequency may need a corresponding increased operating voltage to ensure that the SoC operates correctly. For some integrated circuit (IC) components, different clock frequencies are mapped to different voltage corners so that the voltage is changed with the clocking frequency. The increased speed and voltage increase the heat that is generated by the circuit and the temperature of the SoC.

An SoC is typically operated well below the maximum steady-state clocking frequency and voltage in order to reduce power consumption and heat generation. Dynamic voltage and frequency scaling (DVFS) is a technique that can be used to adjust the frequency and voltage applied to an SoC to deliver the needed performance at the optimal power level. A DVFS enabled SoC can dynamically scale the clock frequency and/or supply voltage of a respective one of the processors/cores.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

In one example, an apparatus for dynamic voltage and frequency scaling is provided. The apparatus includes a plurality of processing cores and a dynamic voltage and frequency scaling (DVFS) resource manager coupled to the plurality of processing cores. The DVFS resource manager is configured to: adjust a first clocking frequency of a first processing core of the apparatus based on a request of the first processing core; adjust a second clocking frequency of a second processing core of the apparatus that shares a voltage rail with the first processing core, based on a first mapping rule between the first clocking frequency and the second clocking frequency; and adjust a voltage of the voltage rail to enable the first processing core to operate at the first clocking frequency and the second processing core to operate at the second clocking frequency.

Another example provides a method of dynamic voltage and frequency scaling (DVFS) at an apparatus. The method includes: adjusting a first clocking frequency of a first processing core of the apparatus based on a request of the first processing core; adjusting a second clocking frequency of a second processing core of the apparatus that shares a voltage rail with the first processing core, based on a first mapping rule between the first clocking frequency and the second clocking frequency; and adjusting a voltage of the voltage rail to enable the first processing core to operate at the first clocking frequency and the second processing core to operate at the second clocking frequency.

Another example provides an apparatus for dynamic voltage and frequency scaling. The apparatus includes: means for adjusting a first clocking frequency of a first processing core of the apparatus based on a request of the first processing core; means for adjusting a second clocking frequency of a second processing core of the apparatus that shares a voltage rail with the first processing core, based on a first mapping rule between the first clocking frequency and the second clocking frequency; and means for adjusting a voltage of the voltage rail to enable the first processing core to operate at the first clocking frequency and the second processing core to operate at the second clocking frequency.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects disclosed herein provide various dynamic voltage and frequency scaling (DVFS) techniques to optimize the high voltage residency of a device containing multiple processing cores that share a voltage rail (power supply voltage). Each processing core is an individual processing unit within a processor of the device. The device may include one or more processors. The DVFS techniques described herein can reduce the high voltage residency (duration) of the voltage rail by aligning the high frequency duration of multiple cores sharing the same voltage rail. In some aspects, the disclosed DVFS techniques use a ruler-follower mechanism that allows a processing core to register as a ruler core, a follower core, or a non-participating (neutral) core. A ruler core can influence the frequency or vote of a follower core that shares the same voltage rail. A ruler core can have one or more follower cores, and a follower core can follow one or more ruler cores.

In some aspects, a follower core can follow a ruler core to operate at a higher clocking frequency when the ruler core votes for a higher clocking frequency. In some examples, the follower core may be limited to follow the ruler core subject to certain limitations (e.g., frequency limit, bandwidth constraint, and/or power or current limit). The disclosed ruler-follower DVFS mechanism can improve high frequency residency alignment between the cores to minimize the high voltage residency on the shared voltage rail. High frequency residency refers to the time during which a core operates at a clocking frequency higher than its default or nominal clocking frequency. High voltage residency refers to the time during which a core operates at a rail voltage higher than its default or nominal rail voltage. In some examples, the ruler-follower mechanism can be limited up to a certain frequency and voltage corner level to limit rail peak current and also avoid data bandwidth starvation for one or more processing cores (e.g., real time cores). In some aspects, the disclosed DVFS techniques may be used for a single IC, a packaged processor, or for clocked components of a system-on-chip (SoC), including a central processing unit (CPU) and one or more cores of the CPU.

Figure 1:
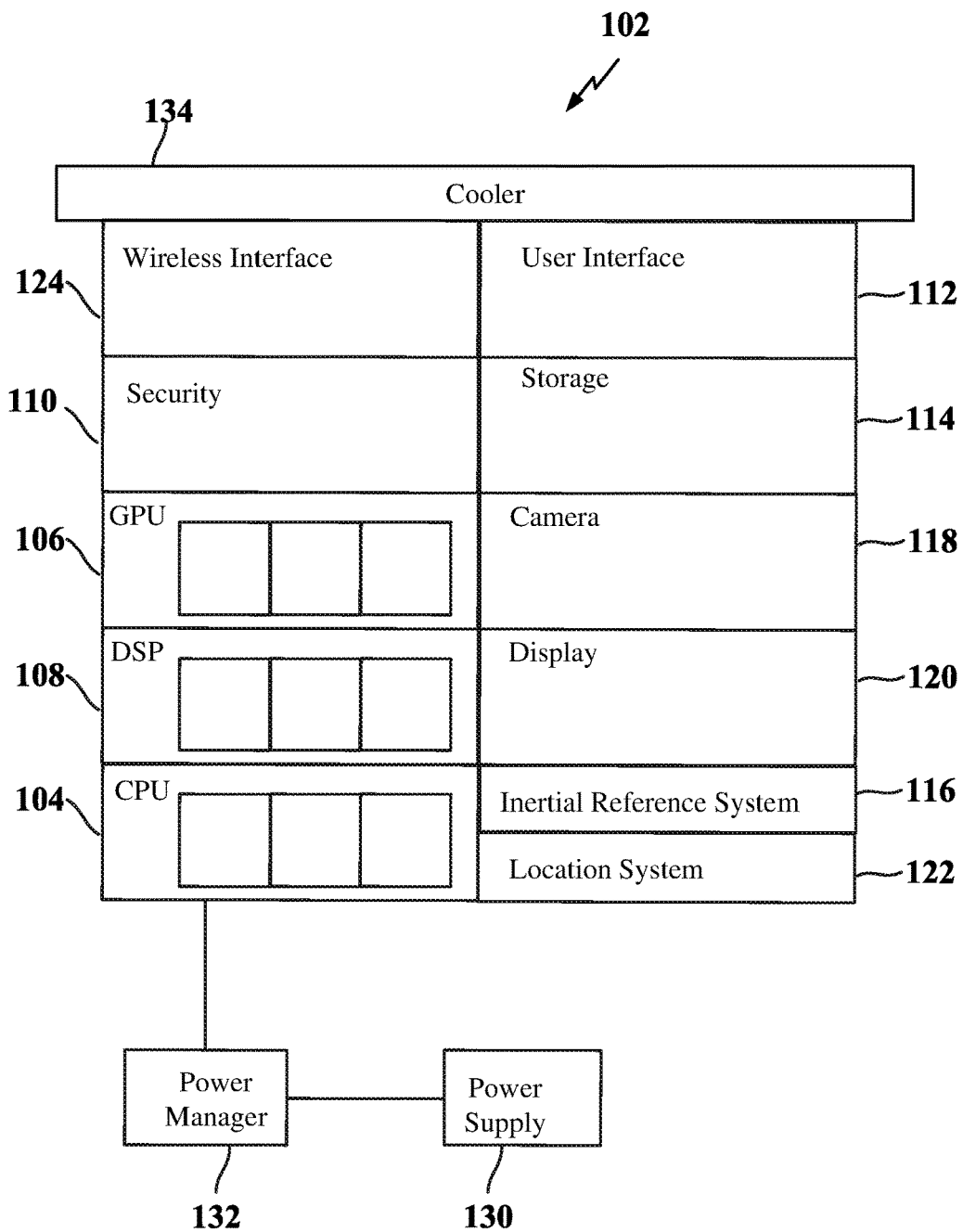
FIG. 1 illustrates a block diagram of a system on chip (SoC) in accordance with some aspects of the disclosure.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects or uses may come about via integrated circuit chip examples and other non-module-component based devices (for example, end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM (Original Equipment Manufacturer) devices or systems incorporating one or more aspects of the described innovations. In some practical settings, devices incorporating described aspects and features may also necessarily include additional components and features for implementation and practice of claimed and described aspects. For example, temperature and power sensors may use a number of components for analog and digital purposes (for example, hardware components including a power supply, a transducer, a detector, an accumulator, a digital to analog converter, etc.). It is intended that innovations described herein may be practiced in a wide variety of devices, chip-level components, systems, distributed arrangements, end-user devices, etc. of varying sizes, shapes, and constitution FIG. 1 is a block diagram of a system-on-chip (SoC) suitable for use with a portable device or computer. The SoC 102 has a multiple core processor, such as a CPU 104, a multiple core graphics processor such as a graphics processing unit (GPU) 106, a multiple core digital signal processor, such as a DSP (digital signal processor) 108, and a security module 110 that provides secret keys, device security, encryption, and decryption. Each of the CPU 104, GPU 106, and DSP 108 may include one or more processing cores. Each processing core is an individual processing unit within a processor of the SoC. In some aspects, the cores may be controlled to use the same or different clocking frequencies. The SoC 102 may also include a user interface 112 coupled to external components, such as a touchscreen, keyboard, buttons, etc. The SoC shown in FIG. 1 can further include a mass storage 114, an inertial reference unit 116, a camera 118, a display driver 120, and position sensors 122, such as a satellite positioning system. In addition, the SoC may include a wireless interface 124 that couples to analog radio frequency components and antennas (not shown) to support wireless data and control interfaces.

Each of the components can be coupled through a bus (not shown) or through the CPU 104, and more or fewer components may be used to suit particular applications. As an alternative to the SoC 102, as shown, any one or more components may be manufactured on separate chips and packaged together or separately.

The SoC 102 is coupled to a power supply 130, such as a battery or a power converter, through a power manager 132 that may be on the SoC or a discrete component. The power manager 132 regulates the power of the components of the SoC 102. The power manager 132 can control the clocking frequencies and voltages applied to the components of the SoC 102. The power manager 132 can further control the voltage applied to the SoC and is also able to measure the battery charge level of the power supply.

The cores of the CPU 104, GPU 106, and other components, such as the mass storage 114 and wireless interface 124, among others may include or be fitted with thermal sensors and power sensors, in the form of voltage sensors, current sensors, or both. The sensors provide sensor data to the power manager 132 that may be used by the power manager 132 in regulating the frequency and/or voltage provided to the components. The power manager 132 may include, for example, clocking circuits and voltage regulators among other components as described in more detail below. In some examples, the CPU 104, GPU 106, and other clocked components may also include a power manager circuit or software to determine appropriate clocking frequencies and voltages. The determined clocking frequencies and voltages may be sent to the power manager 132 for application or the clocked component may adjust clocking frequencies and voltages independent of the power manager 132.

Figure 2:
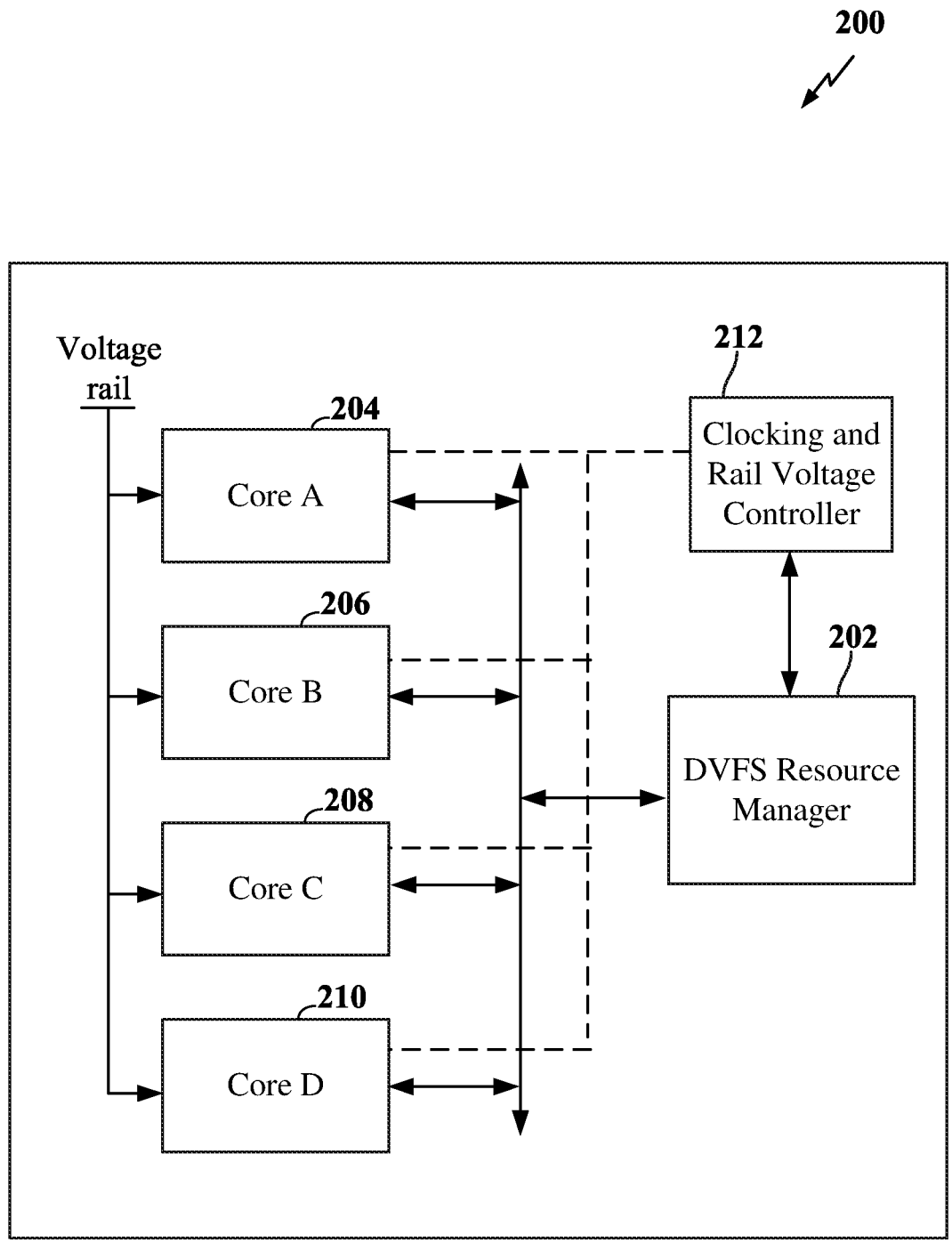
FIG. 2 illustrates a block diagram of a processor with dynamic voltage and frequency scaling (DVFS) in accordance with some aspects of the disclosure.

FIG. 2 illustrates a block diagram of a processor 200 with multiple processing cores and a dynamic voltage and frequency scaling (DVFS) resource manager 202 configured to control the clocking frequency of the processing cores. In some aspects, the processor 200 may be implemented within the SoC 102 of FIG. 1. The processor 200 may contain more components that are not shown in FIG. 1 in order to simplify the description. The DVFS resource manager 202 can optimize the power consumption of the processing cores (e.g., core A 204, core B 206, core C 208, and core D 210) while maintaining acceptable performance levels. The cores 204, 206, 208, and 210 may be used to implement the clocked components (e.g., CPU 104, GPU 106, and DSP 108) in the SoC 102. The DVFS resource manager 202 can receive votes from each of the processing cores 204, 206, 208, and 210. In some aspects, each core can send a DVFS request or vote to the DVFS resource manager 202 to indicate a clocking frequency and/or voltage request. For example, a core can send a vote to increase or decrease its clocking frequency. In some aspects, the vote may indicate a required frequency (F_req) and an optimal frequency (F_opt). F_req can indicate the minimum clocking frequency needed by the core to process the current workload of the core, and F_opt can indicate the optimal clocking frequency (e.g., most energy efficient) for the core to handle the current workload. In some aspects, it is contemplated that the DVFS request or vote can indicate a voltage and/or a clocking frequency.

In some aspects, each core can determine its vote based on anticipated application processing or workload demand. The DVFS resource manager 202 aggregates the votes and determines the respective clocking frequencies of the cores based on the votes. The DVFS resource manager 202 can consider additional parameters (e.g., data bandwidth constraints and power rail current constraints) in addition to the votes to determine the clocking frequencies. Based on the votes and/or the additional parameters, the DVFS resource manager 202 can select a higher or lower clocking frequency for each processor core.

In some aspects, the processor 200 includes a clocking and rail voltage controller 212 that can work with the DVFS resource manager to supply and control the rail voltage and frequency of each processing core (e.g., cores 204, 206, 208, and 210). The DVFS resource manager 202 can use the clocking and rail voltage controller 212 to change the clocking frequency and/or rail voltage of each core according to the votes received from one or more cores based on a ruler-follower DVFS scheme. Examples of the ruler-follower DVFS scheme are described in more detail below. The cores may be controlled to use the same or different clocking frequencies. In some aspects, the DVFS technique described herein may be performed by an application-specific integrated circuit (ASIC) and/or in software executed in a programmable processor (e.g., CPU 104). A single DVFS ASIC or program may be shared between more than one core.

Figure 3:
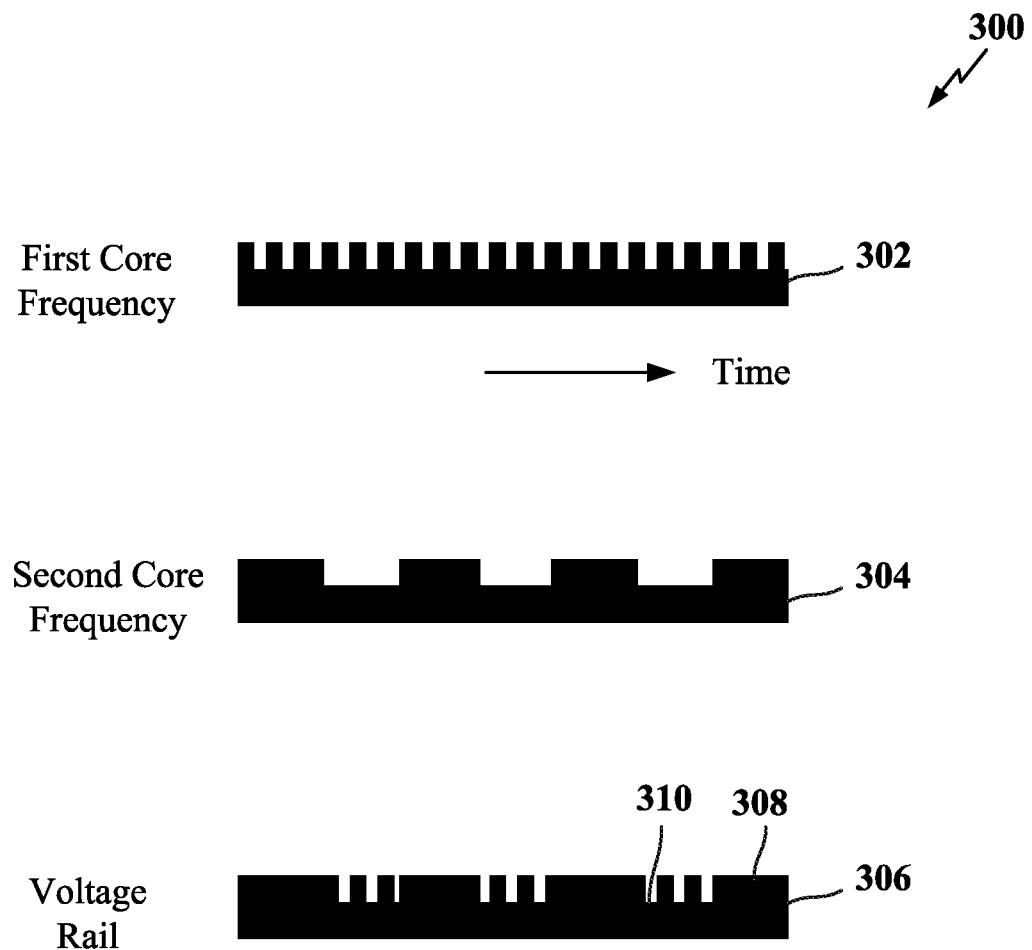
FIG. 3 illustrates an exemplary DVFS frequency and voltage pattern in accordance with some aspects of the disclosure.

FIG. 3 illustrates an example of a DVFS frequency and voltage pattern 300 of an SoC according to some aspects. The DVFS resource manager (e.g., DVFS resource manager 202 shown in FIG. 2) can use a first clocking frequency pattern 302 of a first core (core A) and a second clocking frequency pattern 304 of a second core (core B). In one example, the first core and the second core may be any of the cores included in CPU 104, GPU 106, and DSP 108 described above in FIG. 1. In these clocking frequency patterns, the x-axis (horizontal direction) indicates time, and the y-axis (vertical direction) indicates a clocking frequency used for the corresponding core. A higher frequency portion indicates a higher frequency vote requested by the core; a lower frequency portion indicates a lower frequency vote requested by the core. In this example, the first core and second core share the same voltage rail but use independent DVFS schemes. That means, the first core and second core independently vote for the desired clocking frequency to meet their respective use cases.

In the example shown in FIG. 3, the first clocking frequency pattern 302 of the first core corresponds to about 50% of high frequency residency (duration in high frequency), and the second clocking frequency pattern 304 of the second core also corresponds to about 50% of high frequency residency. To enable the cores to operate at the higher clocking frequency, the SoC can increase the voltage rail that supplies power to the first core and the second core. In some aspects, the voltage rail can be configured to support a plurality of voltages (e.g., V1, V2, V3, . . . Vmax). When the cores use independent DVFS schemes, the resulting voltage residency of the shared voltage rail may not be optimal. FIG. 3 illustrates the voltage rail activity 306 corresponding to the first clocking frequency pattern 302 and the second clocking frequency pattern 304. In this case, the voltage rail activity has about 75% of residency (duration) at a higher voltage level 308 instead of at a lower voltage level 310. The above described independent DVFS scheme does not attempt to overlap or align the high frequency durations of the clocking frequency patterns in response to the voting from multiple cores, thereby resulting in longer duration spent in the higher voltage 308 than needed.

Figure 4:
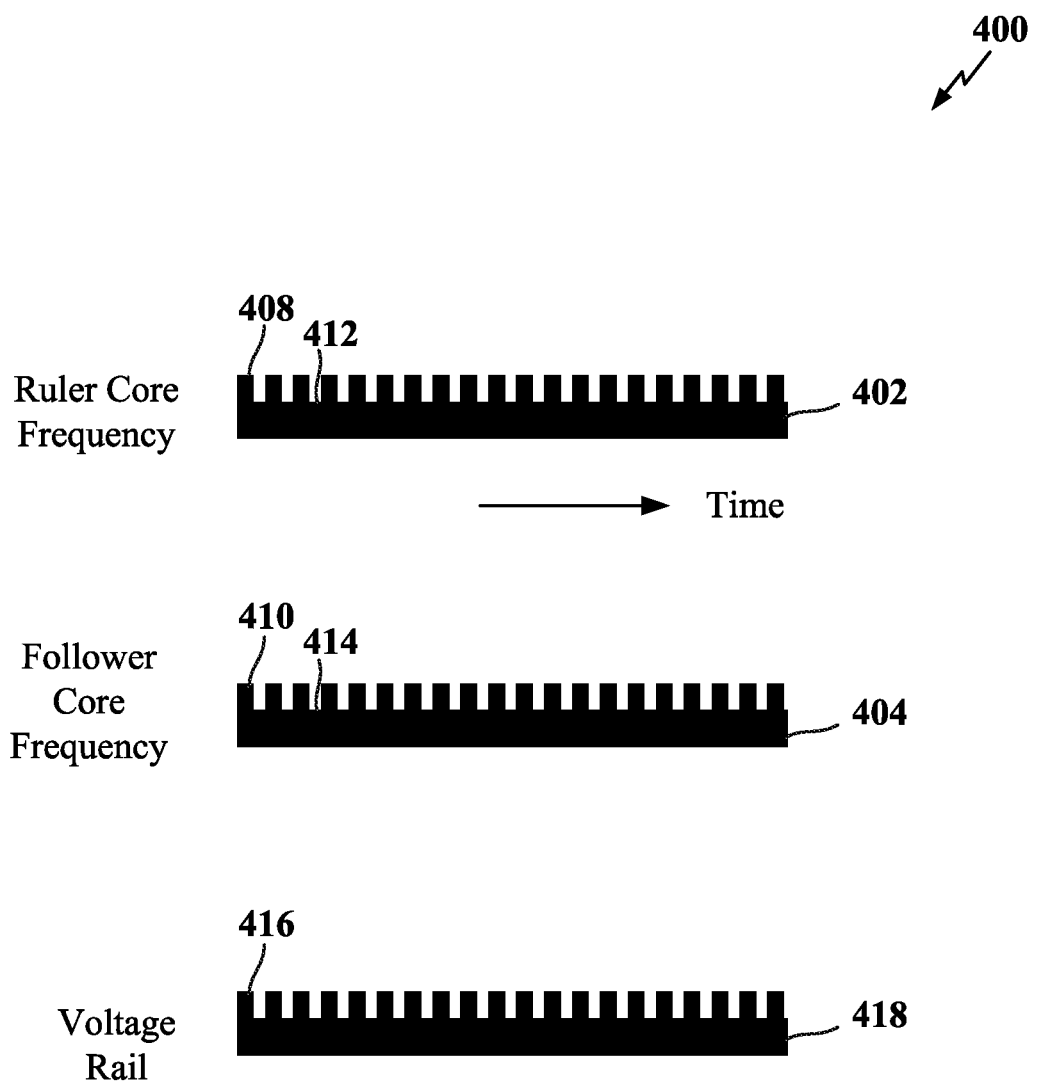
FIG. 4 illustrates another exemplary DVFS frequency and voltage pattern in accordance with some aspects of the disclosure.

FIG. 4 illustrates another example of a DVFS frequency and voltage pattern 400 of an SoC according to some aspects. For example, the SoC may be the SoC 102 of FIG. 1 or any processing device with multiple cores. FIG. 4 illustrates a first clocking frequency pattern 402 of a first core (core A) and a second clocking frequency pattern 404 of a second core (core B). In one example, the first core and the second core may be any of the cores (e.g., CPU 104, GPU 106, and DSP 108) of the SoC 102. In these clocking frequency patterns, the x-axis (horizontal direction) indicates time, and the y-axis (vertical direction) indicates a clocking frequency for the corresponding core. In this example, the first core and second core share the same voltage rail and implement a ruler-follower DVFS scheme that can optimize (e.g., minimize) the high voltage residency (duration) of the voltage rail.

In the example shown in FIG. 4, the first core (core A) is the ruler, and the second core (core B) is the follower. In one aspect, a core can be preconfigured to be a ruler or a follower by default. In one aspect, a core can register with the DVFS resource manager 202 (FIG. 2) to be a ruler core or a follower core. A follower core is associated with and follows (opportunistically) a ruler core in terms of the timing of sending a DVFS request or vote for changing a clocking frequency and/or a rail voltage. The ruler core can influence the timing of a DVFS request or vote of the follower core. In some aspects, the DVFS request or vote may indicate a rail voltage and/or a clocking frequency needed by the core. For example, when the ruler core votes for a higher clocking frequency/voltage, the follower core can follow to increase its clock frequency/voltage (if needed). When the ruler core votes for a lower clocking frequency/voltage, the follower core can follow the ruler to use a lower clocking frequency/voltage. It is also contemplated that a follower core can send a DVFS request or vote in the absence of a ruler core DVFS request or vote, when the follower core needs to adjust its clocking frequency/voltage to meeting provide meeting certain performance and/or power consumption requirement. In some cases, a DVFS resource manager (e.g., the DVFS resource manager 202 shown in FIG. 2) can increase or decrease the clocking frequency of the follower core to follow the clocking frequency of the ruler core. The ruler-follower DVFS scheme enables the follower core to opportunistically use a higher clock frequency in time alignment with the ruler core.

In the example illustrated in FIG. 4, the first clocking frequency pattern 402 of the ruler core corresponds to about 50% of high frequency residency (duration), and the second clocking frequency pattern 404 of the follower core also corresponds to about 50% of high frequency residency. In this case, the two clocking frequency patterns are aligned in time. A high frequency portion 408 of the first clocking frequency pattern 402 aligns in time with a high frequency portion 410 of the second clocking frequency pattern 404. Similarly, a low frequency portion 412 of the first clocking frequency pattern 402 aligns in time with a low frequency portion 414 of the second clocking frequency pattern 404. To enable the cores to operate at the higher clocking frequency, the SoC can increase the voltage rail that supplies power to the ruler core and the follower core. Increasing the voltage rail refers to increasing a voltage level of a power supply voltage of the core. In some aspects, the voltage rail can be configured to support a plurality of voltages (e.g., V1, V2, V3, . . . Vmax). Because the ruler core and the follower core implement the ruler-follower DVFS scheme, the resulting high voltage residency 416 (high voltage portion) of the voltage rail can be more optimal (e.g., minimized) than that can be achieved in the independent DVFS scheme described above in FIG. 3. FIG. 4 illustrates the voltage rail activity 418 corresponding to the first clocking frequency pattern 402 and the second clocking frequency pattern 404. Using the ruler-follower DVFS scheme, the voltage rail activity has about 50% of high voltage residency (less than the 75% residency in FIG. 3). Because the ruler-follower DVFS scheme enables the high clocking frequency portions of a ruler core and a follower core to overlap in time, the high voltage duration of the voltage rail can be optimized, for example, minimizing the duration a voltage rail at a higher voltage.

Figure 5:
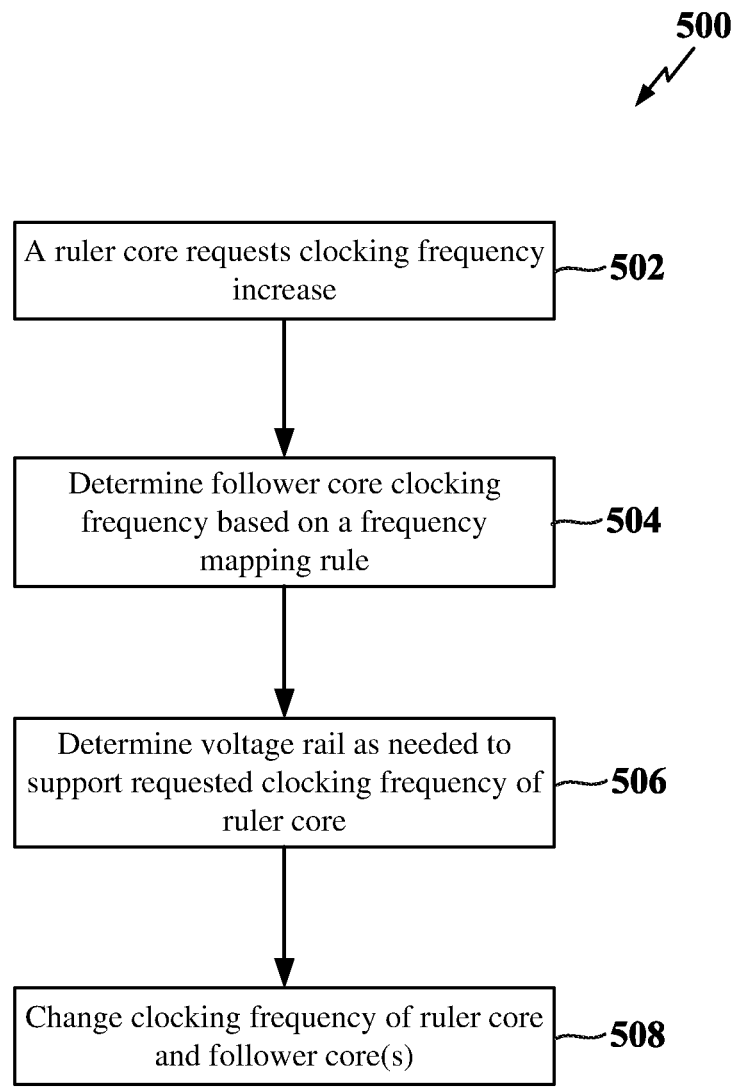
FIG. 5 illustrates a flowchart of a ruler-follower DVFS process in accordance with some aspects of the disclosure.

FIG. 5 is a flowchart illustrating a ruler-follower DVFS process 500 according to some aspects of the disclosure. In one example, the DVFS process 500 may be performed by the SoC 102 shown in FIG. 1 equipped with a DVFS resource manager 202 shown in FIG. 2 or any processor. The SoC 102 may have multiple processing cores (e.g., cores in CPU 104, GPU 106, and/or DSP 108). One or more of the processing cores may be a ruler core, and one or more of the processing cores may be a follower core as described above in relation to FIGS. 3 and 4. It is contemplated that a ruler core may have one or more follower cores, and a follower core may follow one or more ruler cores, in clocking frequency.

Figure 6:
FIG. 6 illustrates mapping tables for implementing a ruler-follower DVFS scheme in accordance with some aspects of the disclosure.
Figure 6:

At 502, a ruler core can request a clocking frequency increase. For example, the ruler core may need to increase its clocking frequency to handle a higher workload. For example, the workload may be a task, a program, or a process running on the ruler core. When the workload is higher than a certain threshold, the ruler core can transmit a request (e.g., a DVFS vote) to a DVFS resource manager to request a clocking frequency increase. The ruler core may be configured to operate at a plurality of clocking frequencies. In one example, table 600 of FIG. 6 illustrates a plurality of clocking frequencies Fa-1, Fa-2, Fa-3, . . . , Fa-max usable by the ruler core. Fa-1 is the lowest clocking frequency, Fa-2 is a higher clocking frequency than Fa-1, Fa-3 is a higher clocking frequency than Fa-2, and Fa-max is the highest clocking frequency. The ruler core can handle a higher workload when it is operating at a higher clocking frequency, for example, at Fa-2 instead of Fa-1. The plurality of available clock frequencies enable the ruler core to meet different target performance levels using different clocking frequencies.

In some aspects, it is contemplated with the ruler core can request a rail voltage increase that implicitly indicates a corresponding clocking frequency increase (e.g., based on the table 600 of FIG. 6). A high rail voltage also the ruler core to operate at a high clocking frequency. Similarly, the ruler core can request a rail voltage decreases that implicitly indicates a corresponding clocking frequency decrease.

At 504, the DVFS resource manager can determine the clocking frequency of one or more follower cores that can follow the ruler core. In some aspects, the DVFS resource manager can determine the clocking frequency of each follower core based on a frequency mapping rule between the ruler core and the follower core. Table 602 of FIG. 6 illustrates an exemplary mapping rule between a ruler core (e.g., core A) and two follower cores (e.g., core B and core C). In some examples, the SoC 102 may have one or more neutral cores (e.g., core D) that do not follow a ruler core in clocking frequency. In table 602, the clocking frequencies Fa-1, Fa-2, Fa-3, . . . , and Fa-max of core A (a ruler core) are mapped to the clocking frequencies Fb-1, Fb-2, Fb-3, . . . , and Fb-max of core B (a follower core), respectively. In this example, the clocking frequencies have a 1-to-1 mapping. Each increase in the core A clocking frequency is followed by a corresponding increase in the core B clocking frequency. In other aspects, the clocking frequencies between cores may not have a 1-to-1 mapping. For example, when the clocking frequency of core A (a ruler core) increases, the clocking frequency of core C (a follower core) may increase up to a predetermined limit or threshold (e.g., Fc-2) and stop increasing even when the ruler core increases its clocking frequency further. Setting a limit on the clocking frequency increase of a follower core can provide a safety mechanism to prevent the supply current from exceeding a current limit of the shared power rail.

In one example, while frequency Fa-1 of core A (ruler) maps to frequency Fc-1 of core C, multiple clocking frequencies (e.g., Fa-2 to Fa-max) of core A map to the same clocking frequency (e.g., Fc-2) of core C (follower). In one example, when the ruler core (core A) changes its clocking frequency to Fa-2, the DVFS resource manager can change the clocking frequencies of core B and core C (follower cores) to Fb-2 and Fc-2, respectively.

At 506, the DVFS resource manager can determine the voltage rail level to support the requested clocking frequency of the ruler core and the clocking frequency of each follower core. In some aspects, the DVFS resource manager can configure the voltage rail to provide various voltage levels (e.g., V1, V2, . . . and Vmax shown in table 600 of FIG. 6). For example, the ruler core (e.g., core A in FIG. 6) can operate at Fa-1 when the voltage rail is at V1, at Fa-2 when the voltage rail is at V2, at Fa-max when the voltage rail is at Vmax, so on. In general, a higher voltage rail allows the ruler core to operate at a higher clocking frequency. However, a higher voltage and/or clocking frequency can increase the power consumption of the core. In some aspects, the DVFS resource manager can adjust the voltage rail level to the minimum voltage level needed for enabling the clocking frequency of the ruler core and each follower core. In some aspects, it is contemplated that the ruler core and the follower core can use different voltage rail levels.

At 508, the DVFS resource manager can change the clocking frequency of the ruler core to the requested clocking frequency (e.g., Fa-2) and the clocking frequency of each follower core according to the mapping rule (e.g., mapping table). For example, the DVFS resource manager can change the clocking frequency of the ruler core from Fa-1 to Fa-2. In some aspects, the ruler core's request (e.g., vote) may indicate a required clocking frequency (F_req) and an optimum clocking frequency (F_opt), and the DVFS resource manager can set the clocking frequency to a frequency between F_req and F_opt, inclusive.

Figure 7:
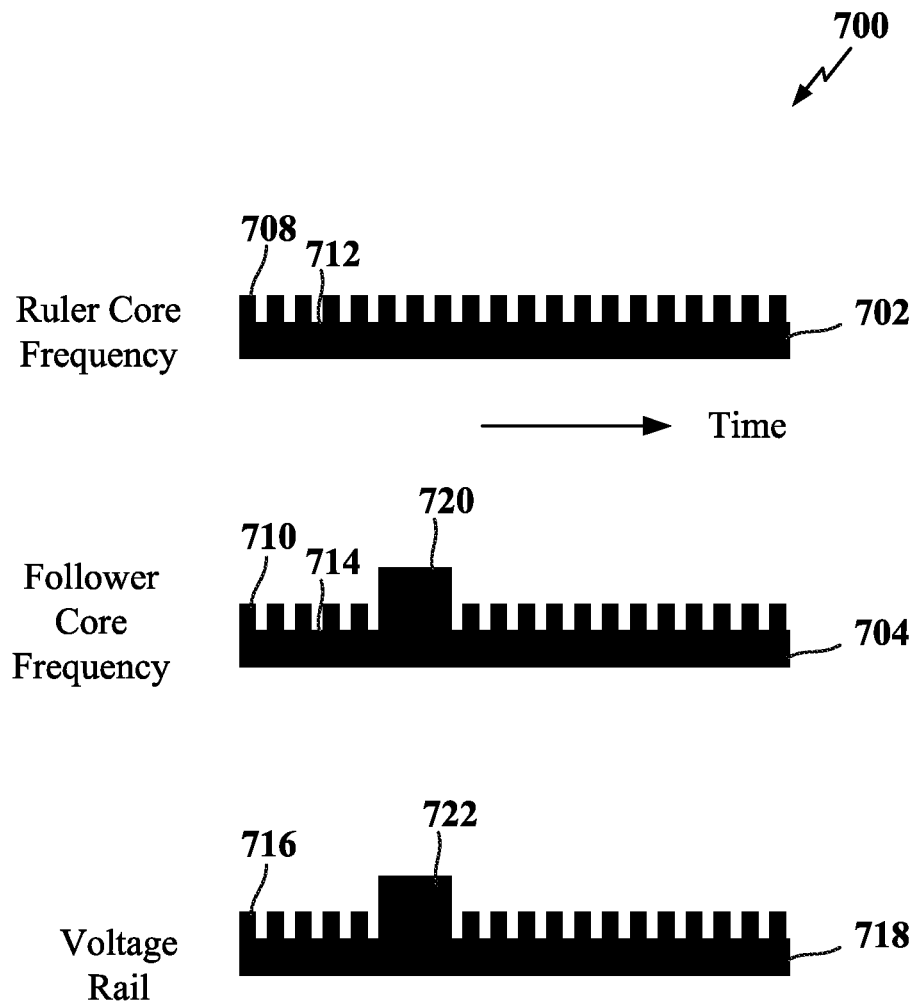
FIG. 7 illustrates yet another exemplary DVFS frequency and voltage pattern in accordance with some aspects of the disclosure.

FIG. 7 illustrates another example of a DVFS frequency and voltage pattern 700 of an SoC according to some aspects. For example, the SoC may be the SoC 102 of FIG. 1 or any processing device with multiple cores. FIG. 7 illustrates a first clocking frequency pattern 702 of a first core (a ruler core) and a second clocking frequency pattern 704 of a second core (a follower core). In one example, the first core and the second core may be any of the cores (e.g., CPU 104, GPU 106, and DSP 108) of the SoC 102. In these clocking frequency patterns, the x-axis (horizontal direction) indicates time, and the y-axis (vertical direction) indicates a clocking frequency for the corresponding core. In this example, the first core and the second core can share the same voltage rail and implement a ruler-follower DVFS scheme that can optimize (e.g., minimize) the high voltage residency (duration) of the voltage rail. Only the pertinent difference between the example illustrated in FIG. 7 and that of FIG. 4 are described herein to reduce unnecessary repetition of the disclosure.

In some aspects, a ruler core has a first clocking frequency pattern 702, and a follower core has a second clocking frequency pattern 704. Similar to the example of FIG. 4, the follower core can opportunistically follow the ruler core to align their high frequency residency and/or high voltage residency. For example, a high frequency portion 708 of the first clocking frequency pattern 702 can substantially align in time with a high frequency portion 710 of the second clocking frequency pattern 704. Similarly, a low frequency portion 712 of the first clocking frequency pattern 702 can substantially align in time with a low frequency portion 714 of the second clocking frequency pattern 704. The resulting high voltage residency 716 (high voltage portion) of the voltage rail can be more optimal (e.g., minimized) than that can be achieved in the independent DVFS example described above in FIG. 3. The voltage rail activity 718 corresponds to the first clocking frequency pattern 702 and the second clocking frequency pattern 704.

In some aspects, when the follower core opportunistically follows the ruler core in timing for sending a DVFS request or vote, the follower core can request or vote for a clocking frequency and/or a rail voltage higher than that indicated by a default DVFS mapping rule (e.g., table 602 of FIG. 6) utilized by the follower core. In some aspects, it is contemplated that the follower core can request or vote for a clocking frequency or rail voltage increase in the absence of a ruler core request or vote. For example, the follower core (e.g., a software entity running at the follower core) can determine that a current workload (e.g., image processing, signal processing, etc.) can use a clocking frequency higher than that indicated by the mapping rule when the follower core follows the ruler core to increase the clocking frequency. In this case, the follower core can request (vote or a special message) for a clocking frequency 720 that is higher than the high frequency portion 710, to override the mapping rule. It will result in higher and/or longer high voltage residency 722 than the high voltage residency 716. In one example, the DVFS resource manager 202 can receive the request or vote from the follower core that requests a clocking frequency higher than that provided according to the default mapping rule. In one example, the DVFS resource manager 202 can grant the follower's request to override the mapping rule when the device has sufficient resource (e.g., power, bandwidth, etc.) to operate the follower core at the requested higher clocking frequency and the corresponding higher voltage if needed.

Figure 8:
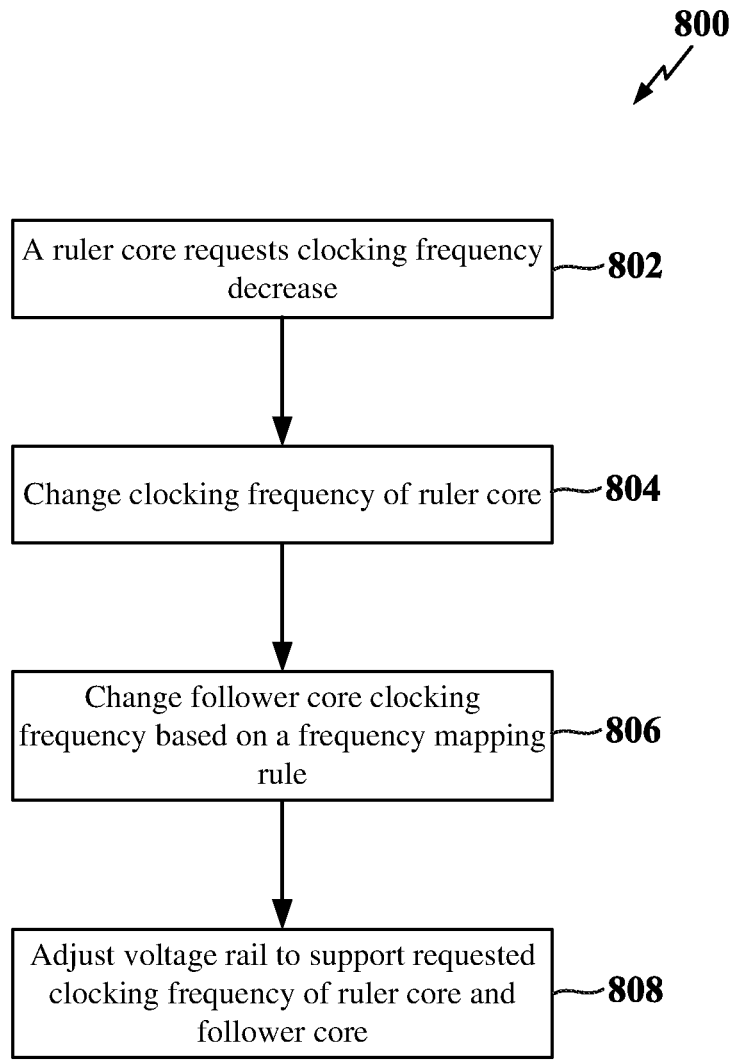
FIG. 8 illustrates a flowchart of another ruler-follower DVFS process in accordance with some aspects of the disclosure.

FIG. 8 is a flowchart illustrating a ruler-follower DVFS process 800 according to some aspects of the disclosure. In one example, the DVFS process 800 may be performed by the SoC 102 shown in FIG. 1 equipped with a DVFS resource manager 202 shown in FIG. 2 as described above. The SoC 102 may have multiple processing cores that include one or more ruler cores, and one or more follower cores as described above in relation to FIGS. 3 and 4. It is contemplated that a ruler core may have one or more follower cores, and a follower core may follow one or more ruler cores.

At 802, a ruler core can request a clocking frequency decrease. For example, the ruler core may request to decrease its clocking frequency to reduce power consumption and/or when the ruler core has a lower workload. For example, the ruler core may transmit a request (e.g., a vote) to a DVFS resource manager to request a clocking frequency decrease. The ruler core may be configured to operate at a plurality of clocking frequencies (e.g., Fa-1, Fa-2, Fa-3, . . . , and Fa-max in table 600 for core A). The ruler core can reduce power consumption when the core runs at a lower clocking frequency. The plurality of available clocking frequencies enable the ruler core to operate at different power consumption levels, for example, based on the current workload.

At 804, the DVFS resource manager can change the clocking frequency of the ruler core (e.g., core A) to the requested clocking frequency based on the request (e.g., vote) received and/or other parameters (e.g., power limit, bandwidth constraints, core temperature, etc.). In one example, the DVFS resource manager can change the clocking frequency of the ruler core from a higher frequency to a lower frequency (e.g., Fa-2 to Fa-1).

At 806, the DVFS resource manager can change the clocking frequency of a follower core based on a frequency mapping rule between the ruler core and the follower core. Table 602 of FIG. 6 illustrates an exemplary mapping rule between a ruler core (e.g., core A) and two follower cores (e.g., core B and core C) as described above. In one example, when the ruler core (core A) decreases its clocking frequency from Fa-2 to Fa-1, the DVFS resource manager can change the clocking frequency of core B from Fb-2 to Fb1 and the frequency of core C (follower cores) from Fc-2 to Fc-1.

At 808, the DVFS resource manager can adjust the voltage rail level (if needed) to support the clocking frequencies of the ruler core and follower core(s). In some aspects, the DVFS resource manager can configure the voltage rail to provide various voltage levels (e.g., V1, V2, . . . Vmax shown in table 600 of FIG. 6). For example, the ruler core (e.g., core A) can operate at Fa-1 when the voltage rail is at V1, at Fa-2 when the voltage rail is at V2, at Fa-max when the voltage rail is at Vmax, so on. In some aspects, the DVFS resource manager can set the voltage rail to the lowest level that can still support the clocking frequencies of all the cores.

The above-described ruler-follower DVFS mechanism can minimize the high voltage residency of the shared voltage rail by aligning the high frequency residency of the ruler and follower cores that shared the same voltage rail. In some aspects, the SoC 102 may have multiple ruler cores, and the DVFS resource manager may maintain a mapping rule (e.g., a mapping table) for each ruler core.

Figure 9:
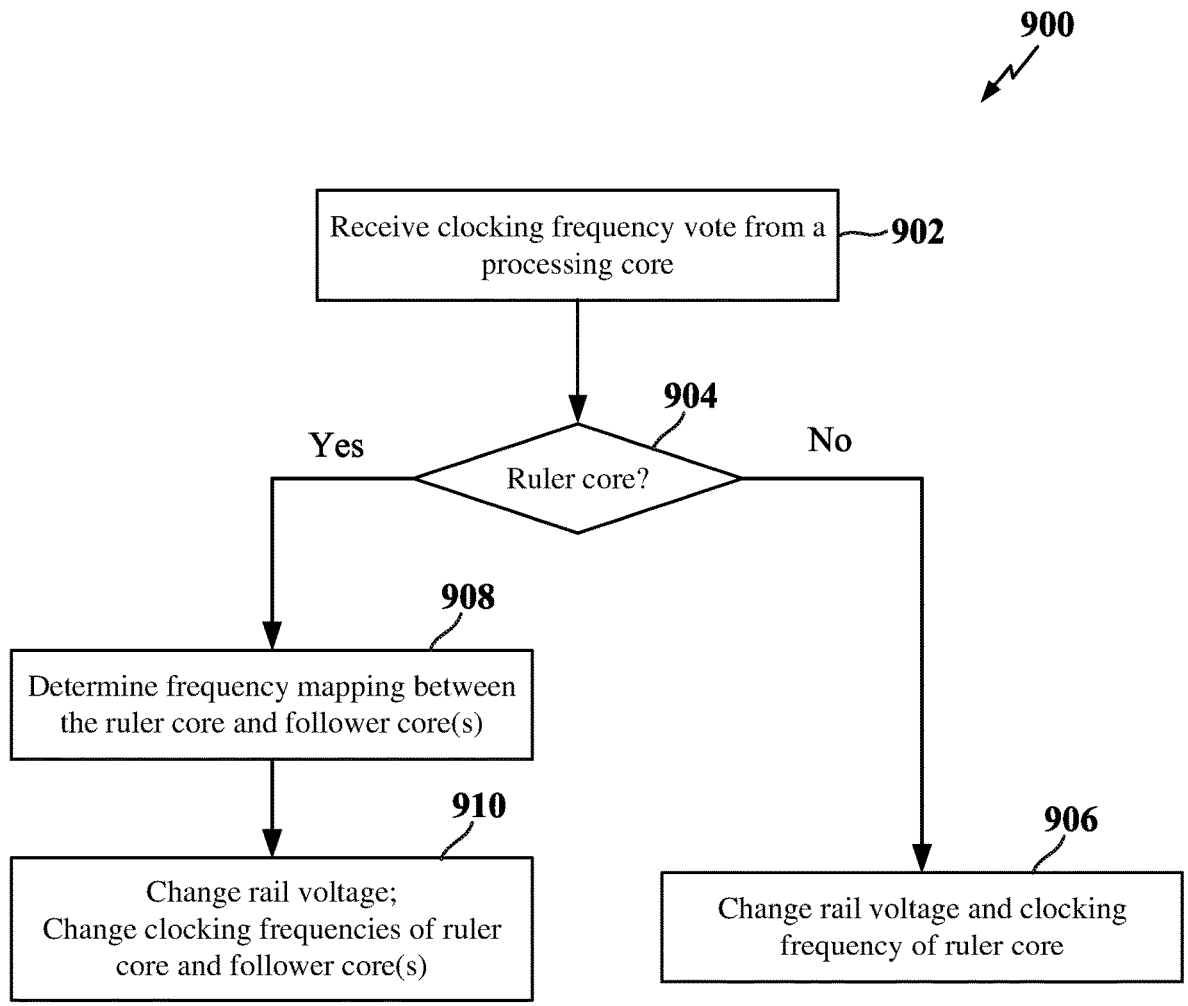
FIG. 9 illustrates a flowchart of a ruler-follower DVFS process for controlling a voltage rail in accordance with some aspects of the disclosure.

FIG. 9 is a flowchart illustrating a DVFS process 900 for controlling a voltage rail according to some aspects of the disclosure. In one example, the DVFS process 900 may be performed by an SoC 102 shown in FIG. 1, which may include, for example, a DVFS resource manager 202 and a clocking and rail voltage controller 212, as described above in connection with FIG. 2. The SoC 102 may have multiple processing cores that include one or more ruler cores, one or more follower cores, and one or more neutral cores as described above in relation to FIGS. 3 and 4. It is contemplated that a ruler core may have one or more follower cores, and a follower core may follow one or more ruler cores.

At block 902, a DVFS resource manager may receive a clocking frequency vote from a processing core (e.g., a core in CPU 104). The processing core may send the vote (request) in order to increase its clocking frequency to handle a higher workload or provide a higher bandwidth (e.g., playing a video stream). At 904, the DVFS resource manager determines whether the vote is received from a ruler core or not. A clocking frequency change (e.g., increase or decrease) of a ruler core can cause the clocking frequency of a follower core to change as well.

At 906, if the vote is not from a ruler core (i.e., a core without a follower core), the DVFS resource manager can change the clocking frequency of the processing core that requested the frequency change, and adjust the rail voltage (if needed) to enable the new clocking frequency.

At 908, if the vote is from a ruler core, the DVFS resource manager determines the frequency mapping between the ruler core and follower core(s). For example, the DVFS resource manager may maintain a mapping table (e.g., table 602) for each ruler core. Each mapping table maps the ruler core's clocking frequencies to those of the follower core(s). Based the mapping table, the DVFS resource manager can determine the clocking frequency of a follower core when the DVFS resource manager changes the clocking frequency of the ruler core according to the request (vote) receive from the ruler core. In one example, the DVFS resource manager can adjust (e.g., increase or decrease) the clocking frequency of the follower core to follow the ruler core.

At 910, the DVFS resource manager can change the rail voltage (if needed) after determining the clocking frequencies of the ruler core and follower core(s). The DVFS resource manager can determine a suitable rail voltage (e.g., a minimum level sufficient for enabling the clocking frequency) that enables the ruler core and follower core(s) to operate at their respective clocking frequencies. In one example, the DVFS resource manager increases the rail voltage when the ruler core frequency is increased, and decreases the rail voltage when the ruler core frequency is decreased.

Figure 10:
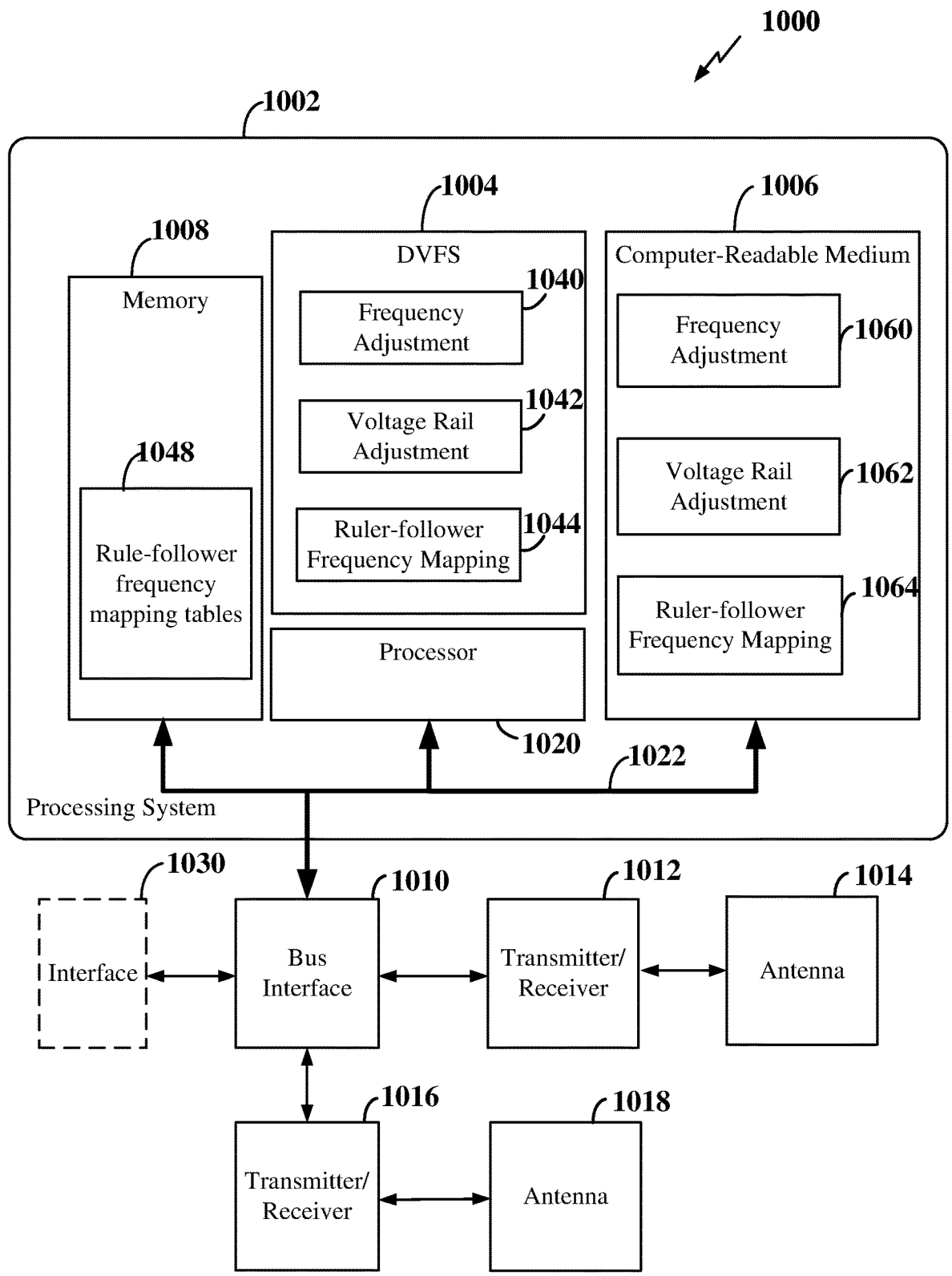
FIG. 10 illustrates a block diagram of an example of a hardware implementation for an apparatus in accordance with some aspects of the disclosure.

FIG. 10 illustrates a block diagram of an example of a hardware implementation for an apparatus 1000, such as a user equipment, a portable device, a notebook computer, a tablet, a computer, a server, a router, a memory array, or any other suitable device with one or more integrated circuits with clocked components (e.g., processing cores). In accordance with various aspects of the disclosure, an element, or any portion of an element, or any combination of elements may be implemented with the processing system 1002. The processing system 1002 may include one or more processors 1020. The processor 1020 can include one or more processing cores as described above. Examples of processors 1020 include microprocessors, microcontrollers, digital signal processors (DSPs), field programmable gate arrays (FPGAs), programmable logic devices (PLDs), state machines, gated logic, discrete hardware circuits, and other suitable hardware configured to be controlled in clocking frequency and a supply rail voltage as described throughout this disclosure. In various examples, the apparatus 1000 may be configured to perform any one or more of the functions and processes described herein.

In this example, the processing system 1002 may be implemented with a bus architecture, represented generally by the bus 1022. The bus 1022 may include any number of interconnecting buses and bridges depending on the specific application of the processing system 1002 and the overall design constraints. The bus 1022 communicatively couples together various circuits including one or more processors (represented generally by the processor 1020), a DVFS circuit 1004, a memory 1008, and a computer-readable medium (represented generally by the computer-readable medium 1006) having instructions stored thereon. The bus 1022 may also link various other circuits and components such as timing sources, peripherals, voltage regulators, and power management circuits, which are well known in the art, and therefore, will not be described any further. A bus interface 1010 provides an interface between the bus 1022 and a primary radio shown as a first transmitter/receiver 1012 or transceiver and at least one first antenna 1014 and between the bus 1022 and an interface 1030 (optional). The first transmitter/receiver 1012 provides a communication interface or means for communicating through the at least one first antenna 1014 with various other apparatus over a wireless transmission medium. The bus interface 1010 also provides an interface between the bus 1022 and a secondary radio shown as a second transmitter/receiver 1016 and a at least one second antenna 1018. In some examples, the wireless device may include two or more transceivers, each configured to communicate with a respective network type (for example, terrestrial or non-terrestrial) through the same or different antennas. The interface 1030 provides a communication interface or means of communicating with various other apparatuses and devices (for example, other devices housed within the same apparatus or other external apparatus) over an internal bus or external transmission medium, such as an Ethernet cable or a Universal Serial Bus (USB) connection. Depending upon the nature of the apparatus, the interface 1030 may include a user interface (for example, keypad, display, speaker, microphone, joystick). Of course, such a user interface is optional, and may be omitted in some examples, such as an IoT device.

The processor 1020 is responsible for managing the bus 1022 and general processing, including the execution of software stored on the computer-readable medium 1006.

The software, when executed by the processor 1020, causes the processing system 1002 to perform the various functions described herein for any particular apparatus. The computer-readable medium 1006 and the memory 1008 may also be used for storing data or information that is manipulated by the processor 1020 when executing software.

In some aspects, the DVFS circuit 1004 may be a part of one or more processor cores of the processor 1020 and perform operations by means of a processor core executing software stored in the computer-readable medium 1006. In some aspects, the DVFS circuit 1004 may be independent of the processor 1020 within the processing system 1002 to execute software stored on the computer-readable medium 1006 using its own processing resources. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 1006. In some aspects, the DVFS circuit 1004 can perform the operations performed by the DVFS resource manager 202 and the clocking and rail voltage controller 212 of FIG. 2. In some aspects, the DVFS circuit 1004 can be configured to perform the operations described above in relation to FIGS. 3-9.

The computer-readable medium 1006 may be a non-transitory computer-readable medium. A non-transitory computer-readable medium includes, by way of example, a magnetic storage device (for example, hard disk, floppy disk, magnetic strip), an optical disk (for example, a compact disc (CD) or a digital versatile disc (DVD)), a smart card, a flash memory device (for example, a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1002, external to the processing system 1002, or distributed across multiple entities including the processing system 1002. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The apparatus 1000 may be configured to perform any one or more of the operations and processes described herein. In some aspects of the disclosure, the DVFS circuit 1004, as utilized in the apparatus 1000, may include circuitry configured for various functions and processes used to implement DVFS techniques described herein.

The DVFS circuit 1004 is coupled to the memory 1008 through the bus 1022. The memory 1008 may include one or more ruler-follower frequency mapping tables (rules) 1048. Each ruler-follower frequency table (e.g., table 600 of FIG. 6) provides the rule for mapping the clocking frequencies of a ruler core to the clocking frequencies of a follower core as described herein. In some aspects, the DVFS circuit 1004 may include frequency adjustment circuitry 1040, voltage rail adjustment circuitry 1042, and ruler-follower frequency mapping circuitry 1044.

The frequency adjustment circuitry 1040 may include one or more hardware components that provide the physical structure that performs various processes related to adjustment (e.g., increase or decreasing) of clocking frequency of the processor 1020 that includes one or more processing cores. The frequency adjustment circuitry 1040 may further be configured to execute frequency adjustment software 1060 included on the computer-readable medium 1006 to implement the DVFS frequency adjustment techniques described herein. The voltage rail adjustment circuitry 1042 may include one or more hardware components that provide the physical structure that performs various processes related to voltage rail adjustment (e.g., increase or decreasing voltage) of the processor 1020 that includes one or more processing cores. The voltage rail adjustment circuitry 1042 may further be configured to execute voltage rail adjustment software 1062 included on the computer-readable medium 1006 to implement the DVFS voltage rail adjustment techniques described herein.

The ruler-follower frequency mapping circuitry 1044 may include one or more hardware components that provide the physical structure that performs various processes related to frequency mapping between a ruler core and one or more follower cores of the processor 1020, for example, based on the rule-follower frequency mapping tables 1048. The ruler-follower frequency mapping circuitry 1044 may further be configured to execute ruler-follower frequency mapping software 1064 included on the computer-readable medium 1006 to implement the DVFS frequency mapping techniques described herein.

The circuit architecture described herein may be implemented on one or more ICs, analog ICs, RFICs, mixed-signal ICs, ASICs, printed circuit boards (PCBs), electronic devices, etc. The circuit architecture described herein may also be fabricated with various process technologies such as complementary metal oxide semiconductor (CMOS), NMOS, PMOS, bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the circuits described herein may be a stand-alone device or may be part of a larger device. A device may be (i) a stand-alone IC, (ii) a set of one or more ICs that may include memory ICs for storing data and/or instructions, (iii) a radio frequency integrated circuit (RFIC) such as an RF receiver (RFR) or an RF transmitter/receiver (RTR), (iv) ASICs such as a mobile station modem (MSM), (v) a module that may be embedded within other devices, (vi) a receiver, cellular phone, wireless device, handset, or mobile unit, (vii) etc.

Figure 11:
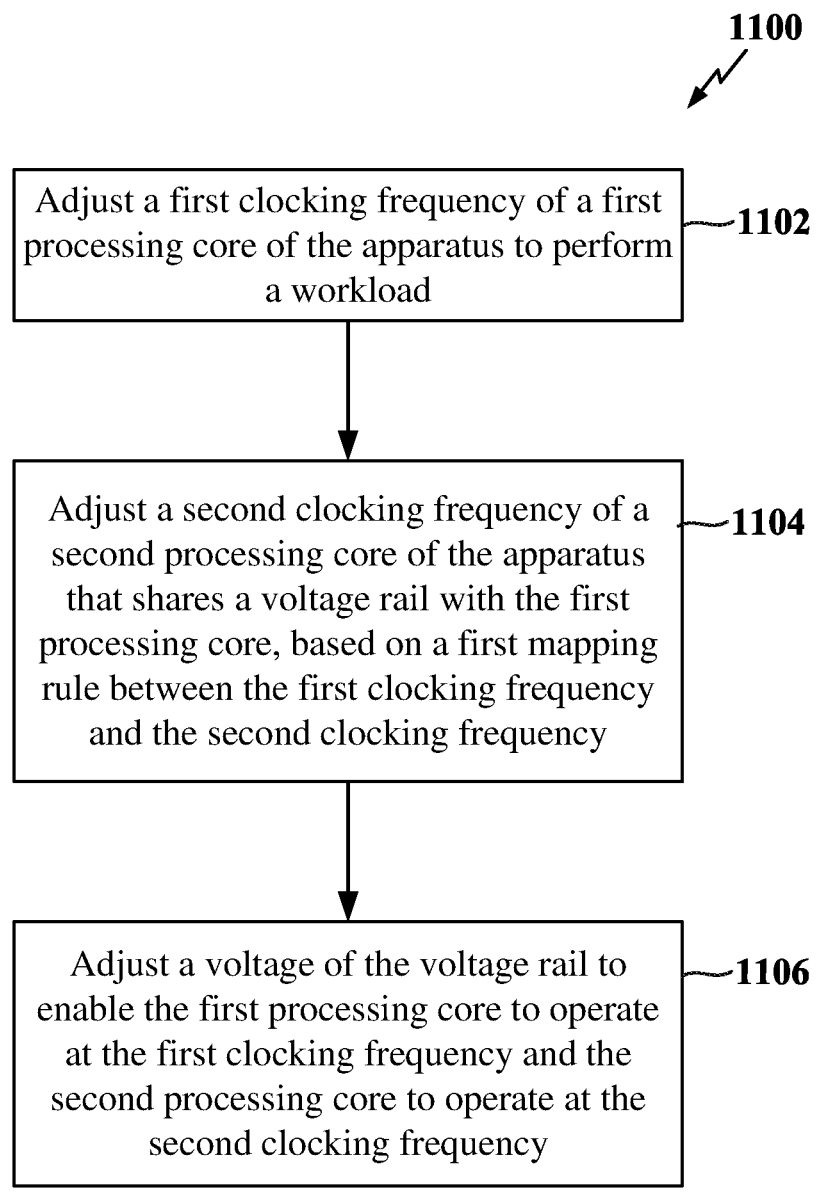
FIG. 11 illustrates a flow diagram of a DVFS method in accordance with some aspects of the disclosure.

FIG. 11 is a process flow diagram illustrating an example of a DVFS method 1100 at an apparatus including multiple processing cores, such as the device 102 of FIG. 1, the processor 200 of FIG. 2, or the device 1000 of FIG. 10. The method may also be performed by other circuitry or components or processing resources than those shown and described herein. In one example, the method can be performed using the DVFS circuit 1004 of FIG. 10 or other circuitry, and software as described in the context of FIG. 10. The method can begin with a first processing core of the apparatus operating at a first clocking frequency. In one example, the first processing core may be operating at a default frequency with a default voltage rail.

At block 1102, the apparatus can adjust a first DVFS parameter of the first processing core of the apparatus to perform a workload. The first DVFS parameter may include a first clocking frequency and/or first rail voltage requested by the first processing core. For example, frequency adjustment circuitry 1040 shown and described above in connection with FIG. 10 may provide a means to adjust the first clocking frequency of the first processing core. The voltage rail adjustment circuitry 1042 shown and described above in connection with FIG. 10 may provide a means to adjust the first rail voltage of the first processing core. In one example, the first processing core may be a core in the CPU 104, DSP 108, or GPU 106 of the SoC 102; or one of the cores 204, 206, 208, and 210 of the processor 200.

At block 1104, the apparatus can adjust a second DVFS parameter of a second processing core of the apparatus that shares a voltage rail with the first processing core, based on a first mapping rule between the first DVFS parameter and the second DVFS parameter. The second DVFS parameter may include a second clocking frequency and/or second rail voltage requested by the second processing core. In one example, the frequency adjustment circuitry 1040 shown and described above in connection with FIG. 10 may provide a means to adjust the second clocking frequency of the second processing core. The voltage rail adjustment circuitry 1042 (FIG. 10) may provide a means to adjust the second rail voltage of the second processing core. In one example, the second processing core may be a core in the CPU 104, DSP 108, or GPU 106 of the SoC 102; or one of the cores 204, 206, 208, and 210 of the processor 200. In some aspects, the first processing core may be a ruler core, and the second processing core may be a follower core. The ruler-follower frequency mapping circuitry 1044 can provide a means to map the first clocking frequency to the second clocking frequency based on a ruler-follower frequency mapping table 1048 that may be stored in the memory 1008. The apparatus can adjust the clocking frequency of the follower core to follow the clocking frequency of the ruler core as described herein.

At block 1106, the apparatus can adjust a voltage of the voltage rail to enable the first processing core to operate at the first clocking frequency and the second processing core to operate at the second clocking frequency. In one example, the voltage rail adjustment circuitry 1042 can provide a means to adjust the voltage of the voltage rail. Because the follower core can opportunistically follow the ruler core in clocking frequency, the apparatus can reduce the residency or use of higher voltage at the shared voltage rail because the follower core and ruler core will have better time alignment in their use of higher clocking frequency.

As used herein, "or" is intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The various illustrative logical blocks, modules, and circuits described in connection with the exemplary aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

In one or more exemplary aspects, the functions described may be implemented in hardware, software, firmware, or any combination thereof. If implemented in software, the functions may be stored on or transmitter over as one or more instructions or code stored on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM EEPROM, CD-ROM or other optical disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The following provides an overview of examples of the present disclosure.

A first aspect of the disclosure provides an apparatus for dynamic voltage and frequency scaling. The apparatus includes: a plurality of processing cores; and a dynamic voltage and frequency scaling (DVFS) resource manager coupled to the plurality of processing cores, wherein the DVFS resource manager is configured to: adjust a first clocking frequency of a first processing core of the apparatus based on a request of the first processing core; adjust a second clocking frequency of a second processing core of the apparatus that shares a voltage rail with the first processing core, based on a first mapping rule between the first clocking frequency and the second clocking frequency; and adjust a voltage of the voltage rail to enable the first processing core to operate at the first clocking frequency and the second processing core to operate at the second clocking frequency.

In a second aspect of the disclosure, alone or in combination with the first aspect, wherein, to adjust the voltage of the voltage rail, the DVFS resource manager is further configured to set the voltage rail to a minimum level sufficient to enable the first processing core to operate at the first clocking frequency and the second processing core to operate at the second clocking frequency.

In a third aspect of the disclosure, alone or in combination with the first aspect, wherein the DVFS resource manager is further configured to: adjust a third clocking frequency of a third processing core of the apparatus based on a second mapping rule between the first clocking frequency and the third clocking frequency, the third processing core configured to share the voltage rail with the first processing core and the second processing core; and adjust the voltage of the voltage rail to enable the first processing core to operate at the first clocking frequency, the second processing core to operate at the second clocking frequency, and the third processing core to operate at the third clocking frequency.

In a fourth aspect of the disclosure, alone or in combination with any of the first to third aspects, wherein, to adjust the second clocking frequency, the DVFS resource manager is further configured to increase the second clocking frequency to follow an increase of the first clocking frequency based on the first mapping rule.

In a fifth aspect of the disclosure, alone or in combination with any of the first to third aspects, wherein, to adjust the second clocking frequency, the DVFS resource manager is further configured to increase the second clocking frequency to a frequency higher than that indicated by the first mapping rule.

In a sixth aspect of the disclosure, alone or in combination with any of the first to third aspects, wherein, to adjust the second clocking frequency, the DVFS resource manager is further configured to: increase the second clocking frequency to follow an increase of the first clocking frequency up to a frequency threshold; and maintain the second clocking frequency at the frequency threshold irrespective of further increase of the first clocking frequency.

In a seventh aspect of the disclosure, alone or in combination with any of the first to third aspects, wherein the DVFS resource manager is further configured to decrease the second clocking frequency to follow a decrease of the first clocking frequency based on the first mapping rule.

In an eighth aspect of the disclosure, alone or in combination with any of the first to third aspects, wherein the first mapping rule comprises a plurality of first values of the first clocking frequency, each of the first values being mapped to a corresponding second value of the second clocking frequency.

In a ninth aspect of the disclosure, alone or in combination with any of the first to third aspects, wherein the first mapping rule comprises a plurality of first values of the first clocking frequency, two or more of the first values being mapped to a same second value of the second clocking frequency.

In a tenth aspect of the disclosure, alone or in combination with any of the first to third aspects, wherein, to adjust the second clocking frequency, the DVFS resource manager is further configured to adjust the second clocking frequency subject to at least one of a power rail current constraint or a bandwidth constraint of the apparatus.

An eleventh aspect of the disclosure provides a method of dynamic voltage and frequency scaling (DVFS) at an apparatus. The method includes: adjusting a first clocking frequency of a first processing core of the apparatus based on a request of the first processing core; adjusting a second clocking frequency of a second processing core of the apparatus that shares a voltage rail with the first processing core, based on a first mapping rule between the first clocking frequency and the second clocking frequency; and adjusting a voltage of the voltage rail to enable the first processing core to operate at the first clocking frequency and the second processing core to operate at the second clocking frequency.

In a twelfth aspect of the disclosure, alone or in combination with the eleventh aspect, wherein the adjusting the voltage of the voltage rail comprises: setting the voltage rail to a minimum level sufficient to enable the first processing core to operate at the first clocking frequency and the second processing core to operate at the second clocking frequency.

In a thirteenth aspect of the disclosure, alone or in combination with the eleventh aspect, the method further comprises: adjusting a third clocking frequency of a third processing core of the apparatus based on a second mapping rule between the first clocking frequency and the third clocking frequency, the third processing core configured to share the voltage rail with the first processing core and the second processing core; and adjusting the voltage of the voltage rail to enable the first processing core to operate at the first clocking frequency, the second processing core to operate at the second clocking frequency, and the third processing core to operate at the third clocking frequency.

In a fourteenth aspect of the disclosure, alone or in combination with any of the eleventh to thirteenth aspects, wherein the adjusting the second clocking frequency comprises: increasing the second clocking frequency to follow an increase of the first clocking frequency based on the first mapping rule.

In a fifteenth aspect of the disclosure, alone or in combination with any of the eleventh to thirteenth aspects, wherein, the adjusting the second clocking frequency comprises increasing the second clocking frequency to a frequency higher than that indicated by the first mapping rule.

In a sixteenth aspect of the disclosure, alone or in combination with any of the eleventh to thirteenth aspects, wherein the adjusting the second clocking frequency comprises: increasing the second clocking frequency to follow an increase of the first clocking frequency up to a frequency threshold; and maintaining the second clocking frequency at the frequency threshold irrespective of further increase of the first clocking frequency.

In a seventeenth aspect of the disclosure, alone or in combination with any of the eleventh to thirteenth aspects, the method further comprises decreasing the second clocking frequency to follow a decrease of the first clocking frequency based on the first mapping rule.

In an eighteenth aspect of the disclosure, alone or in combination with any of the eleventh to thirteenth aspects, wherein the first mapping rule comprises a plurality of first values of the first clocking frequency, each of the first values being mapped to a corresponding second value of the second clocking frequency.

In a nineteenth aspect of the disclosure, alone or in combination with any of the eleventh to thirteenth aspects, wherein the first mapping rule comprises a plurality of first values of the first clocking frequency, two or more of the first values being mapped to a same second value of the second clocking frequency.

In a twentieth aspect of the disclosure, alone or in combination with any of the eleventh to thirteenth aspects, wherein the adjusting the second clocking frequency comprises adjusting the second clocking frequency subject to at least one of a power rail current constraint or a bandwidth constraint of the apparatus.

A twenty-first aspect of the disclosure provides an apparatus for dynamic voltage and frequency scaling (DVFS). The apparatus comprises: means for adjusting a first clocking frequency of a first processing core of the apparatus based on a request of the first processing core; means for adjusting a second clocking frequency of a second processing core of the apparatus that shares a voltage rail with the first processing core, based on a first mapping rule between the first clocking frequency and the second clocking frequency; and means for adjusting a voltage of the voltage rail to enable the first processing core to operate at the first clocking frequency and the second processing core to operate at the second clocking frequency.

In a twenty-second aspect of the disclosure, alone or in combination with the twenty-first aspect, the apparatus further comprises means for setting the voltage rail to a minimum level sufficient to enable the first processing core to operate at the first clocking frequency and the second processing core to operate at the second clocking frequency.

In a twenty-third aspect of the disclosure, alone or in combination with any of the twenty-first to twenty-second aspects, the apparatus further comprises means for increasing the second clocking frequency to follow an increase of the first clocking frequency based on the first mapping rule.

In a twenty-fourth aspect of the disclosure, alone or in combination with any of the twenty-first to twenty-second aspects, the apparatus further comprises means for increasing the second clocking frequency to a frequency higher than that indicated by the first mapping rule.

What is claimed is:

1. An apparatus for dynamic voltage and frequency scaling, comprising:
    a plurality of processing cores, wherein one or more of the plurality of processing cores is a ruler core and one or more of the plurality of processing cores is a follower core; and
    a dynamic voltage and frequency scaling (DVFS) resource manager coupled to the plurality of processing cores,
    wherein the DVFS resource manager is configured to:
        adjust a DVFS parameter of a first processing core of the apparatus based on a request of the first processing core;
        determine a clocking frequency of a second processing cores that can follow the first processing core;
        adjust a second DVFS parameter of the second processing core of the apparatus that shares a voltage rail with the first processing core, based on a first mapping rule between the first DVFS parameter and the second DVFS parameter; and
        adjust a voltage of the voltage rail to enable the first processing core to operate using the first DVFS parameter and the second processing core to operate using the second DVFS parameter.

2. The apparatus of claim 1, wherein, to adjust the voltage of the voltage rail, the DVFS resource manager is further configured to:
    set the voltage rail to a minimum level sufficient to enable the first processing core to operate using the first DVFS parameter and the second processing core to operate using the second DVFS parameter.

3. The apparatus of claim 1, wherein the DVFS resource manager is further configured to:
    adjust a third DVFS parameter of a third processing core of the apparatus based on a second mapping rule between the first DVFS parameter and the third DVFS parameter, the third processing core configured to share the voltage rail with the first processing core and the second processing core; and
    adjust the voltage of the voltage rail to enable the first processing core to operate using the first DVFS parameter, the second processing core to operate using the second DVFS parameter, and the third processing core to operate using the third DVFS parameter.

4. The apparatus of claim 1, wherein the first DVFS parameter comprises a first clocking frequency and the second DVFS parameter comprises a second clocking frequency, and the DVFS resource manager is further configured to:
    increase the second clocking frequency to follow an increase of the first clocking frequency based on the first mapping rule.

5. The apparatus of claim 1, wherein the first DVFS parameter comprises a first clocking frequency and the second DVFS parameter comprises a second clocking frequency, and the DVFS resource manager is further configured to:
increase the second clocking frequency to a frequency higher than that indicated by the first mapping rule.

6. The apparatus of claim 1, wherein the first DVFS parameter comprises a first clocking frequency and the second DVFS parameter comprises a second clocking frequency, and the DVFS resource manager is further configured to:
increase the second clocking frequency to follow an increase of the first clocking frequency up to a frequency threshold; and
maintain the second clocking frequency at the frequency threshold irrespective of further increase of the first clocking frequency.

7. The apparatus of claim 1, wherein the first DVFS parameter comprises a first clocking frequency and the second DVFS parameter comprises a second clocking frequency, and the DVFS resource manager is further configured to:
decrease the second clocking frequency to follow a decrease of the first clocking frequency based on the first mapping rule.

8. The apparatus of claim 1, wherein:
the first DVFS parameter comprises a first clocking frequency and the second DVFS parameter comprises a second clocking frequency; and
the first mapping rule comprises a plurality of first values of the first clocking frequency, each of the first values being mapped to a corresponding second value of the second clocking frequency.

9. The apparatus of claim 1, wherein:
the first DVFS parameter comprises a first clocking frequency and the second DVFS parameter comprises a second clocking frequency; and
the first mapping rule comprises a plurality of first values of the first clocking frequency, two or more of the first values being mapped to a same second value of the second clocking frequency.

10. The apparatus of claim 1, wherein the first DVFS parameter comprises a first clocking frequency and the second DVFS parameter comprises a second clocking frequency, and the DVFS resource manager is further configured to:
adjust the second clocking frequency subject to at least one of a power rail current constraint or a bandwidth constraint of the apparatus.

11. The apparatus of claim 1, wherein each of the first DVFS parameter and the second DVFS parameter comprises at least one of a clocking frequency and a rail voltage.

12. A method of dynamic voltage and frequency scaling (DVFS) at an apparatus, comprising:
adjusting a first DVFS parameter of a first processing core of the apparatus based on a request of the first processing core, wherein the first processing core a ruler core;
determining a clocking frequency of a second processing cores that can follow the first processing core, wherein the second processing core is a follower core;
adjusting a second DVFS parameter of the second processing core of the apparatus that shares a voltage rail with the first processing core, based on a first mapping rule between the first DVFS parameter and the second DVFS parameter; and
adjusting a voltage of the voltage rail to enable the first processing core to operate using the first DVFS parameter and the second processing core to operate using the second DVFS parameter.

13. The method of claim 12, wherein the adjusting the voltage of the voltage rail comprises:
setting the voltage rail to a minimum level sufficient to enable the first processing core to operate using the first DVFS parameter and the second processing core to operate using the second DVFS parameter.

14. The method of claim 12, further comprising:
adjusting a third DVFS parameter of a third processing core of the apparatus based on a second mapping rule between the first DVFS parameter and the third DVFS parameter, the third processing core configured to share the voltage rail with the first processing core and the second processing core; and
adjusting the voltage of the voltage rail to enable the first processing core to operate using the first DVFS parameter, the second processing core to operate at the second DVFS parameter, and the third processing core to operate at the third DVFS parameter.

15. The method of claim 12, wherein the first DVFS parameter comprises a first clocking frequency and the second DVFS parameter comprises a second clocking frequency, and the method further comprises:
increasing the second clocking frequency to follow an increase of the first clocking frequency based on the first mapping rule.

16. The method of claim 12, wherein the first DVFS parameter comprises a first clocking frequency and the second DVFS parameter comprises a second clocking frequency, and the method further comprises:
increasing the second clocking frequency to a frequency higher than that indicated by the first mapping rule.

17. The method of claim 12, wherein the first DVFS parameter comprises a first clocking frequency and the second DVFS parameter comprises a second clocking frequency, and the method further comprises:
increasing the second clocking frequency to follow an increase of the first clocking frequency up to a frequency threshold; and
maintaining the second clocking frequency at the frequency threshold irrespective of further increase of the first clocking frequency.

18. The method of claim 12, wherein the first DVFS parameter comprises a first clocking frequency and the second DVFS parameter comprises a second clocking frequency, and the method further comprises:
decreasing the second clocking frequency to follow a decrease of the first clocking frequency based on the first mapping rule.

19. The method of claim 12, wherein:
the first DVFS parameter comprises a first clocking frequency and the second DVFS parameter comprises a second clocking frequency; and
the first mapping rule comprises a plurality of first values of the first clocking frequency, each of the first values being mapped to a corresponding second value of the second clocking frequency.

20. The method of claim 12, wherein:
the first DVFS parameter comprises a first clocking frequency and the second DVFS parameter comprises a second clocking frequency; and
the first mapping rule comprises a plurality of first values of the first clocking frequency, two or more of the first values being mapped to a same second value of the second clocking frequency.

21. The method of claim 12, wherein the first DVFS parameter comprises a first clocking frequency and the second DVFS parameter comprises a second clocking frequency, and the method further comprises:

adjusting the second clocking frequency subject to at least one of a power rail current constraint or a bandwidth constraint of the apparatus.

22. An apparatus for dynamic voltage and frequency scaling (DVFS), comprising:

means for adjusting a first DVFS parameter of a first processing core of the apparatus based on a request of the first processing core, wherein the first processing core a ruler core;

means for determining a clocking frequency of a second processing cores that can follow the first processing core, wherein the second processing core is a follower core;

means for adjusting a second DVFS parameter of the second processing core of the apparatus that shares a voltage rail with the first processing core, based on a first mapping rule between the first DVFS parameter and the second DVFS parameter; and means for adjusting a voltage of the voltage rail to enable the first processing core to operate using the first DVFS parameter and the second processing core to operate using the second DVFS parameter.

23. The apparatus of claim 22, further comprising:

means for setting the voltage rail to a minimum level sufficient to enable the first processing core to operate using the first DVFS parameter and the second processing core to operate using the second DVFS parameter.

24. The apparatus of claim 22, wherein the first DVFS parameter comprises a first clocking frequency and the second DVFS parameter comprises a second clocking frequency, and the apparatus further comprises:

means for increasing the second clocking frequency to follow an increase of the first clocking frequency based on the first mapping rule.

25. The apparatus of claim 22, wherein the first DVFS parameter comprises a first clocking frequency and the second DVFS parameter comprises a second clocking frequency, and the apparatus further comprises:

means for increasing the second clocking frequency to a frequency higher than that indicated by the first mapping rule.

\* \* \* \* \*